(12) United States Patent
Yun et al.

(10) Patent No.: US 8,023,560 B2
(45) Date of Patent: Sep. 20, 2011

(54) APPARATUS AND METHOD FOR PROCESSING 3D VIDEO BASED ON MPEG-4 OBJECT DESCRIPTOR INFORMATION

(75) Inventors: Kug-Jin Yun, Daejon (KR); Suk-Hee Cho, Daejon (KR); Chung-Hyun Ahn, Daejon (KR); Soo-In Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1503 days.

(21) Appl. No.: 10/582,429

(22) PCT Filed: Dec. 30, 2003

(86) PCT No.: PCT/KR03/02922
§ 371 (c)(1),
(2), (4) Date: Jun. 8, 2006

(87) PCT Pub. No.: WO2005/057932
PCT Pub. Date: Jun. 23, 2005

(65) Prior Publication Data
US 2007/0115276 A1     May 24, 2007

(30) Foreign Application Priority Data
Dec. 9, 2003   (KR) .................. 10-2003-0089159

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.01

(58) Field of Classification Search .................. None
See application file for complete search history.

(56) References Cited

U.S. PATENT DOCUMENTS

| 7,302,464 B2 * | 11/2007 | Kim et al. ............... 709/203 |
| 2001/0000962 A1 * | 5/2001 | Rajan ...................... 345/302 |
| 2003/0095177 A1 | 5/2003 | Yun et al. |

FOREIGN PATENT DOCUMENTS

| EP | 1 324 230 A2 | 7/2003 |
| JP | 2003-281022 | 10/2003 |
| KR | 1020030042090 A | 5/2003 |

(Continued)

OTHER PUBLICATIONS

Koenen, R., "MPEG-4: Multimedia for our time," IEEE Spectrum, vol. 36, No. 2 (Feb. 1999) pp. 26-33.

(Continued)

*Primary Examiner* — Nhon Diep
(74) *Attorney, Agent, or Firm* — Blakely, Sokoloff, Taylor & Zafman

(57) ABSTRACT

The present invention relates to three-dimensional video processing apparatus and method using MPEG-4 object descriptor information and structures. The three-dimensional video processing apparatus and method that can support a three-dimensional video service smoothly to thereby provide a sense of reality and a cubic effect in an MPEG-4-based system by suggesting a three-dimensional video object descriptor structure and providing to a client an object descriptor, which includes information on kind of three-dimensional video, number of viewpoints, number of media streams and a plurality of display methods; and a method thereof.

5 Claims, 7 Drawing Sheets

FOREIGN PATENT DOCUMENTS

KR   1020040090523 A   10/2004

OTHER PUBLICATIONS

Ohm, J.-R., "Stereo/Multiview Video Encoding Using the MPEG Family of Standards," Proceedings of the SPIE Conference on Stereoscopic Displays and Applications X, SPIE vol. 3639 (Jan. 25, 1999) pp. 242-255.

Signes, J., "Binary Format for Scene (BIFS): Combining MPEG-4 media to build rich multimedia services," Proceedings of the SPIE Conference on Visual Communications and Image Processing '99, SPIE vol. 3653 (Jan. 25, 1999) pp. 1506-1517.

Signes, J., et al., "MPEG-4's binary format for scene description," Signal Processing: Image Communication, vol. 15, No. 4/05 (Jan. 2000) pp. 321-345.

MPEG-4 Systems: Architecting Object-Based Audio-Visual Content, Multimedia Signal Processing, 1998 IEEE Second Workshop, pp. 535-540, Dec. 1998.

MPEG-7: A Content Description Standard Beyond Compression, IEEE Circuits and Systems, 1999. 42nd Midwest Symposium, vol. 2, pp. 770-777, Aug. 1999.

The MPEG-7 Standard and the Content-based Management of Three-dimensional Data: A Case Study, Multimedia Computing and Systems, 1999. IEEE International Conference, vol. 1, pp. 375-380.

Design and implementation of streaming system for MPEG-4 based interactive contents over IP networks, IEEE Ditital and Computatational Video, 2002 Proceedings, pp. 100-107, Nov. 2002.

\* cited by examiner

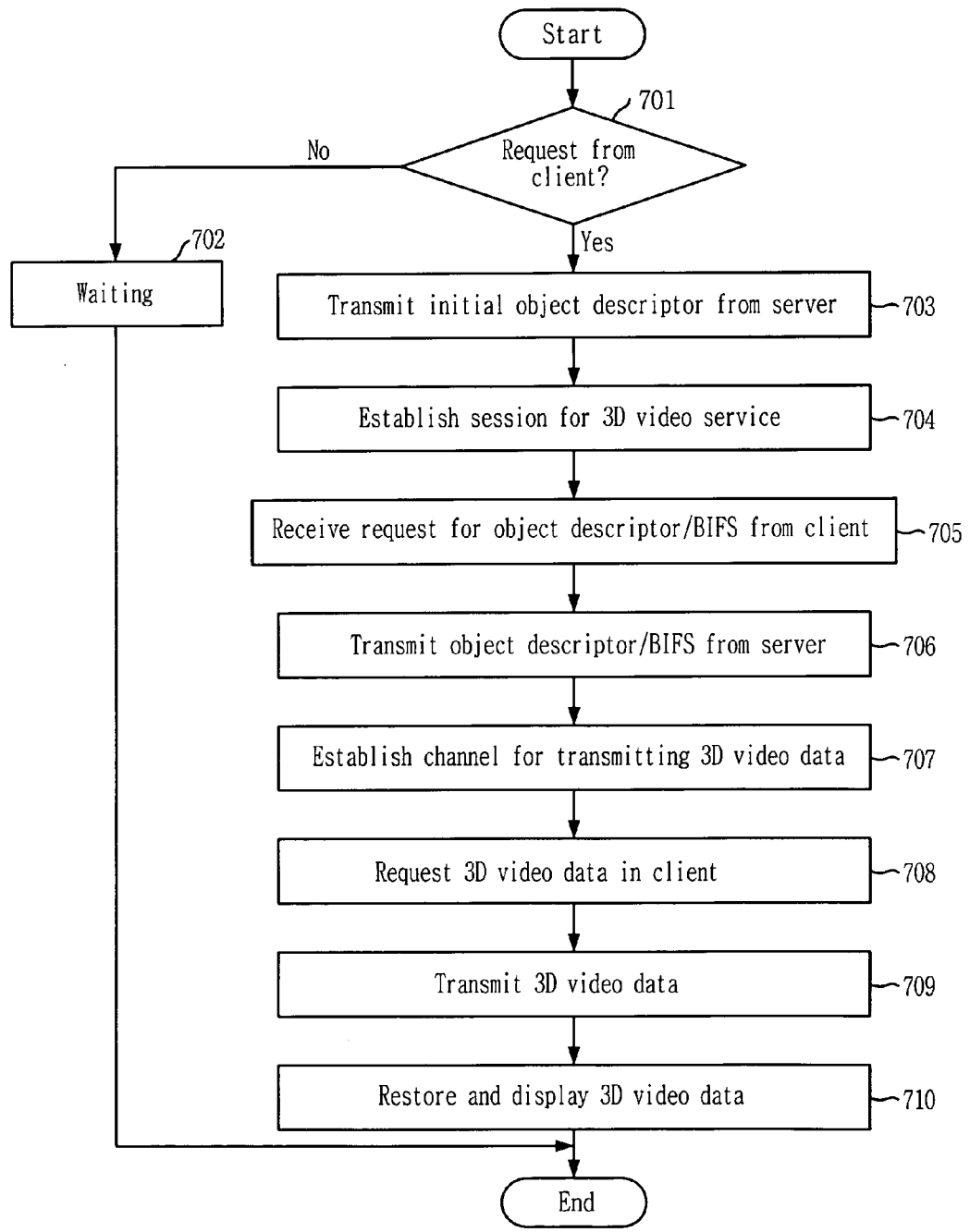

APPARATUS AND METHOD FOR PROCESSING 3D VIDEO BASED ON MPEG-4 OBJECT DESCRIPTOR INFORMATION

TECHNICAL FIELD

The present invention relates to an apparatus and method for processing three-dimensional video; and, more particularly, to a three-dimensional video processing apparatus and method using a Moving Picture Experts Group (MPEG)-4 object descriptor (OD) and structure that defines a three-dimensional video object descriptor, which includes newly requested information such as the kind of three-dimensional video, a plurality of display methods, and the number of viewpoints based on an MPEG-4 object descriptor structure, provides information on the three-dimensional video in a client by using the above-defined three-dimensional video object descriptor, and makes a user to enjoy the video by selecting a desired display method and viewpoint.

BACKGROUND ART

In the Moving Picture Experts Group (MPEG)-4, information representing an object is transmitted through a plurality of elementary streams (ESs). The relationship between the elementary streams and structural information of a link are transmitted by using object descriptors defined in the MPEG-4.

Generally, it requires Initial Object Descriptor (IOD), Binary Format for Scene (BIFS), object descriptors and media data to form a scene based on the MPEG-4.

The initial object descriptor is information that needs to be transmitted first in order to form the MPEG-4 scene. It describes a profile and level of each medium and it includes elementary stream descriptor for a BIFS stream and an object descriptor stream.

The object descriptor is a set of elementary stream descriptors that describe information on each media data forming a scene, and it provides a connection between an elementary stream and a scene description. Also, the BIFS stream is information that represents a spatial/temporal position and activity of video or audio objects that form a scene.

Since the MPEG-4 object descriptors are defined with a focus on the process of two-dimensional video at present, they provides a two-dimensional display service of a low sense of reality and a low cubic effect. Also, due to the rapidly increasing researches and attention on the three-dimensional video, three-dimensional video is used in many application areas, e.g., sports broadcasting, advertisement, education, medical services, and games. However, a structure of an object descriptor that includes the newly requested information such as the kind of three-dimensional video and a display method while maintaining compatibility with the MPEG-4 object descriptor is not introduced.

In short, the three-dimensional video is widely used in various application areas due to the development of computers and communication technology. Since the three-dimensional video can provide more vivid sense of reality and wide view range, compared to the conventional two-dimensional video, it can make a user enjoy video in a desired view point and a desired display method. However, the current MPEG-4 still focuses on processing the two-dimensional video, text data and computer graphics (CG), it cannot provide a service for processing three-dimensional real-picture video inputted through a camera. Consequently, the current MPEG-4 has a problem that it cannot overcome the limit in the transmission and display of three-dimensional video.

DISCLOSURE

Technical Problem

It is, therefore, an object of the present invention to provide a three-dimensional video processing apparatus using a Moving Picture Experts Group (MPEG) 4 object descriptor information and structures that can support a three-dimensional video service smoothly to thereby provide a sense of reality and a cubic effect in an MPEG-4-based system by suggesting a three-dimensional video object descriptor structure and providing to a client an object descriptor, which includes information on kind of three-dimensional video, number of viewpoints, number of media streams and a plurality of display methods; and a method thereof.

Technical Solution

In accordance with one aspect of the present invention, there is provided an apparatus for processing three-dimensional video, which includes: a storing module for storing video acquired with a predetermining video acquisition device; a three-dimensional video generating module for converting a size and color of video transmitted from the storage; an MPEG-4 control signal generating module for generating a Moving Picture Experts Group (MPEG)-4 object descriptor and a Binary Format for Scene (BIFS) descriptor; an encoding module for encoding the three-dimensional video and the MPEG-4 control signal inputted from the three-dimensional video generating module and the MPEG-4 control signal generating module, respectively through an MPEG-4 and encoding method, and outputting elementary stream (ES); an MP4 file generating module for generating an MP4 file in conformity to an MPEG-4 system standards by receiving media data of the elementary stream outputted from the encoding module and the MPEG-4 control signal; a packetizing module for extracting three-dimensional video media stream and the MPEG-4 control signal that are stored in the MP4 file generated in the MP4 file generating module, and generating and transmitting packet streams of the extracted three-dimensional video media stream and the MPEG-4 control signal based on the MPEG-4 system standards; a depacketizing module for receiving the packet stream transmitted from the packetizing module and depacketizing three-dimensional video data including a header and a payload; a decoding module for decoding the data transmitted from the depacketizing module and restoring three-dimensional video; and a display module for displaying the video restored in the decoding module.

In accordance with another aspect of the present invention, there is provided a method for processing three-dimensional video in a video processing apparatus, which includes the steps of: a) determining whether there is an access request from a client in a three-dimensional video transmitting server; b) if there is no access request in the step a), maintaining a waiting mode or, if there is an access request, transmitting an initial object descriptor from the server to the client and establishing a session for a three-dimensional video service; c) transmitting an MPEG-4 object descriptor and a Binary Format for Scene (BIFS) descriptor in the server upon receipt of a request for an object descriptor and a BIFS descriptor from the client; and d) establishing a channel for transmitting three-dimensional video and transmitting the three-dimensional video upon receipt of a request for three-dimensional video from the client, and decoding and displaying the three-dimensional video in the client.

DESCRIPTION OF DRAWINGS

The above and other objects and features of the present invention will become apparent from the following description of the preferred embodiments given in conjunction with the accompanying drawings, in which:

FIG. 7 is a flowchart describing a three-dimensional video processing method using proposed MPEG-4 object descriptor information and structure in accordance with an embodiment of the present invention.

BEST MODE FOR THE INVENTION

Other objects and aspects of the invention will become apparent from the following description of the embodiments with reference to the accompanying drawings, which is set forth hereinafter.

Figure 1:
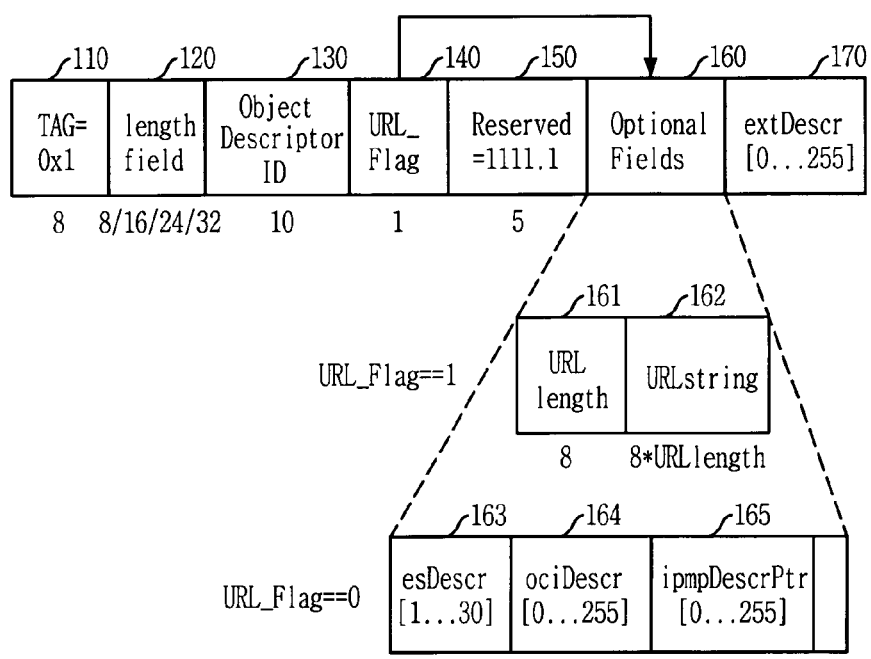
FIG. 1 is a diagram illustrating a general structure and elements of an object descriptor of a Moving Picture Experts Group 4 (MPEG-4) in accordance with an embodiment of a prior art.

FIG. 1 is a diagram illustrating a general structure and elements of an object descriptor of a Moving Picture Experts Group 4 (MPEG-4) in accordance with an embodiment of a prior art.

Generally, the MPEG-4 needs an initial object descriptor, a Binary Format for Scene (BIFS), an object descriptor, and media data to form a scene. In particular, an object descriptor of three-dimensional video that describes information on an elementary stream of a three-dimensional video should be understood to support the three-dimensional video.

The object descriptor is a combination of elementary stream (ES) descriptors that identify, describe and connect elementary streams about an audio/visual object which is used to describe a scene.

In the drawing, a tag (TAG)=0x01 110 represents an object descriptor among MPEG-4 descriptors and it always has a unique value.

A length field 120 denotes a length of the object descriptor.

An object descriptor identification (ID) 130 is an identification value of the object descriptor and it does not allow a value "0."

A Uniform Resource Locator (URL) flag (URL_Flag) 140 indicates that there is a URL string (URLstring) 162 following thereto.

A Reserved=1111.1 150 denotes a reserved bit.

Optional fields 160 denotes a selected area and the optional fields 160 includes a URL length 161, a URL string 162, an "esDescr[ ]" 163, an "ociDescr[ ]" 164, and an "ipmpDescrPtr[ ]" 165.

First, the URL length 161 indicates a byte-based length of the URL string 162.

The URL string 162 indicates another object descriptor.

The "esDescr[ ]" 163 is information about each audio/visual elementary stream. That is, it has an elementary stream descriptor with respect to each media stream. Actually, a client acquires information about the media stream based on the elementary stream descriptor.

The "ociDescr[ ]" 164 denotes additional information of an object descriptor that corresponds to an author and a keyword.

The "ipmpDescrPtr[ ]" 165 denotes a pointer that points out an "IPMP_Descriptor" including Intellectual Property Management and Protection (IPMP) data. The IPMP is used to protect each elementary stream.

An "extDescr" 170 is an extension descriptor and it can be defined by a user for additional descriptors that can be used in future.

Meanwhile, the client acquires characteristics of each object and correlation information for audio/visual data by analyzing a transmitted object descriptor. However, since the object descriptor focuses on a two-dimensional display method such as two-dimensional video, still image, audio, text and computer graphics, it has a limit in expressing three-dimensional video with more than two viewpoints which is acquired from a camera.

Figure 2:
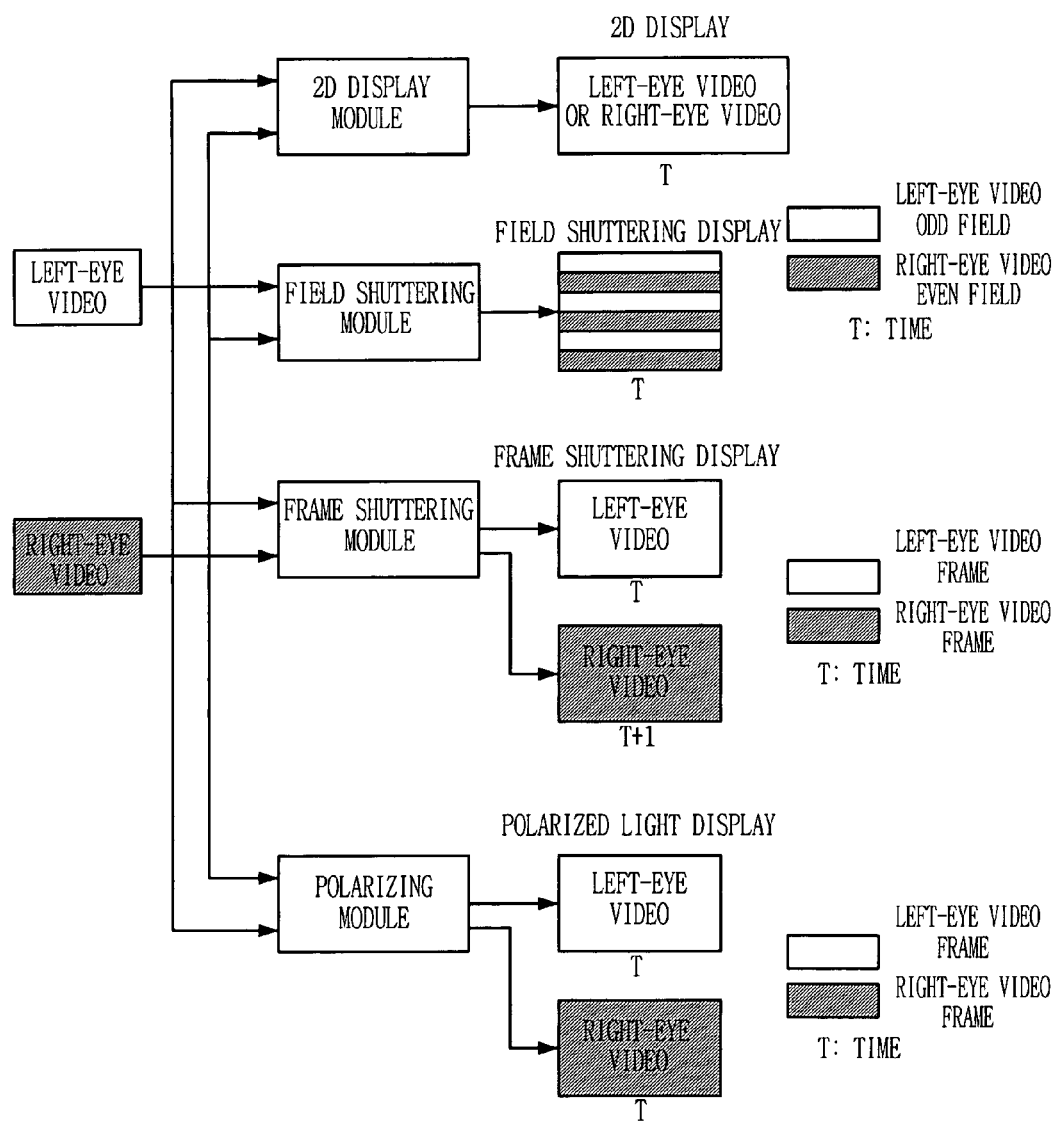
FIG. 2 is a diagram describing a conventional method for displaying binocular three-dimensional video in accordance with an embodiment of a prior art.

FIG. 2 is a diagram describing a conventional method for displaying binocular three-dimensional video in accordance with an embodiment of a prior art.

In case of three-dimensional video, binocular or multi-viewpoint three-dimensional video is acquired according to the number and arrangement of cameras. Also, differently from the conventional two-dimensional video, the three-dimensional video can be displayed in diverse display methods characteristically.

The binocular three-dimensional video includes two viewpoints and, basically, it can be displayed in a field shuttering display method, a frame shuttering display method, and a polarized light display method and it can be also displayed in two-dimensional display method.

The field shuttering method is a method that recombines an odd field of a left-eye image with an even field of a right-eye image at the same time of T.

The frame shuttering method is a method that displays a left-eye image and a right-eye image at times T and T+1 with a time interval.

The polarized light display method displays an image of one viewpoint between the left-eye image and the right-eye image.

Figure 3:
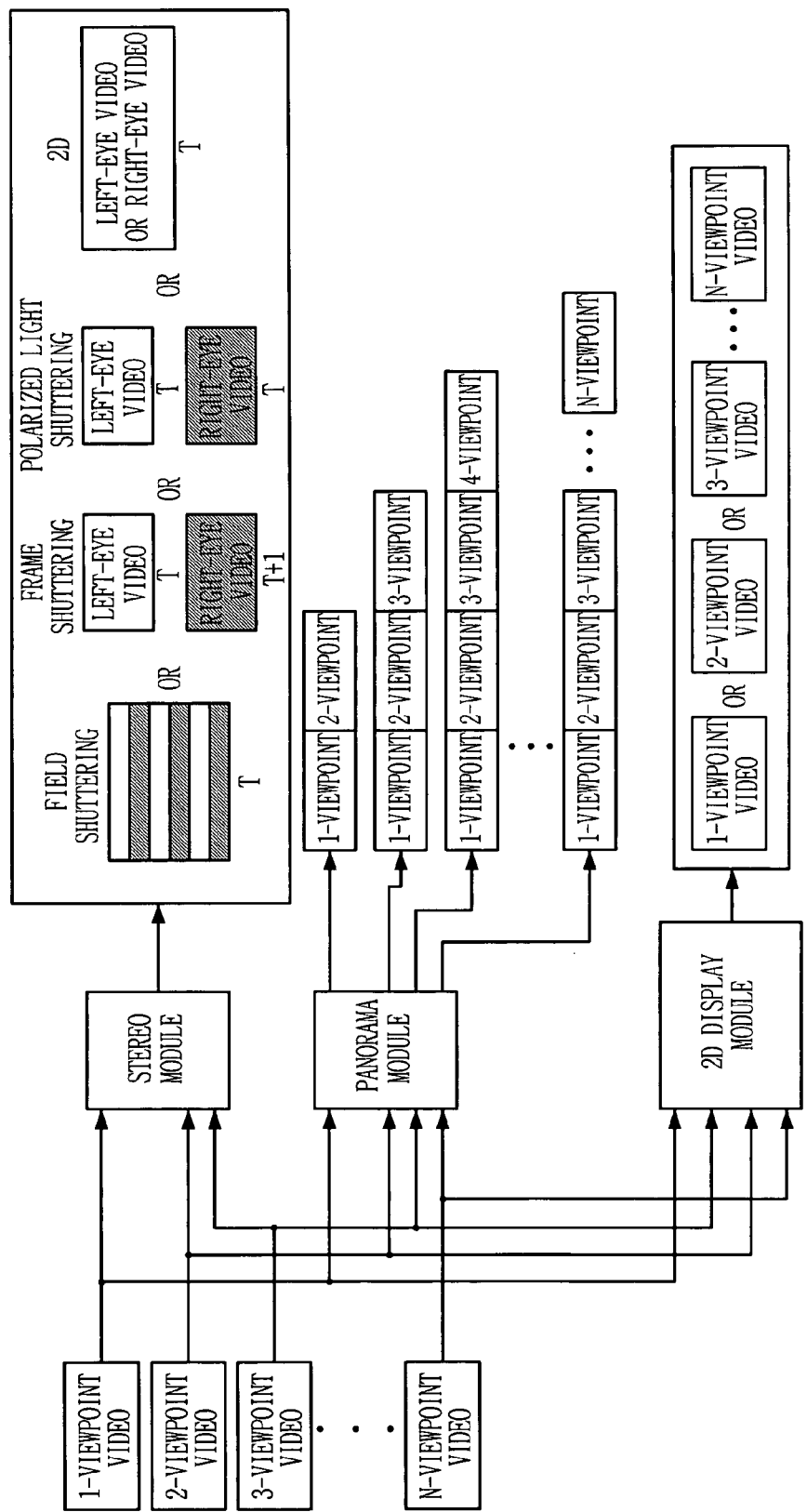
FIG. 3 is a diagram describing a conventional method for displaying multi-viewpoint three-dimensional video in accordance with an embodiment of a prior art.

FIG. 3 is a diagram describing a conventional method for displaying multi-viewpoint three-dimensional video in accordance with an embodiment of a prior art, and it presents a case when cameras maintains the stereoscopic camera space.

Multi-viewpoint three-dimensional video includes more than three viewpoints. Basically, it supports two-dimensional/panorama display method and, if the space between cameras is kept to be the stereoscopic camera space, it can also support the stereoscopic display method, e.g., the field shutting/frame shuttering/polarized light/two-dimensional display methods.

The panorama display method shows video of all viewpoints after removing redundancy of images from images acquired from cameras, and it provides a wide view range.

Figure 4:
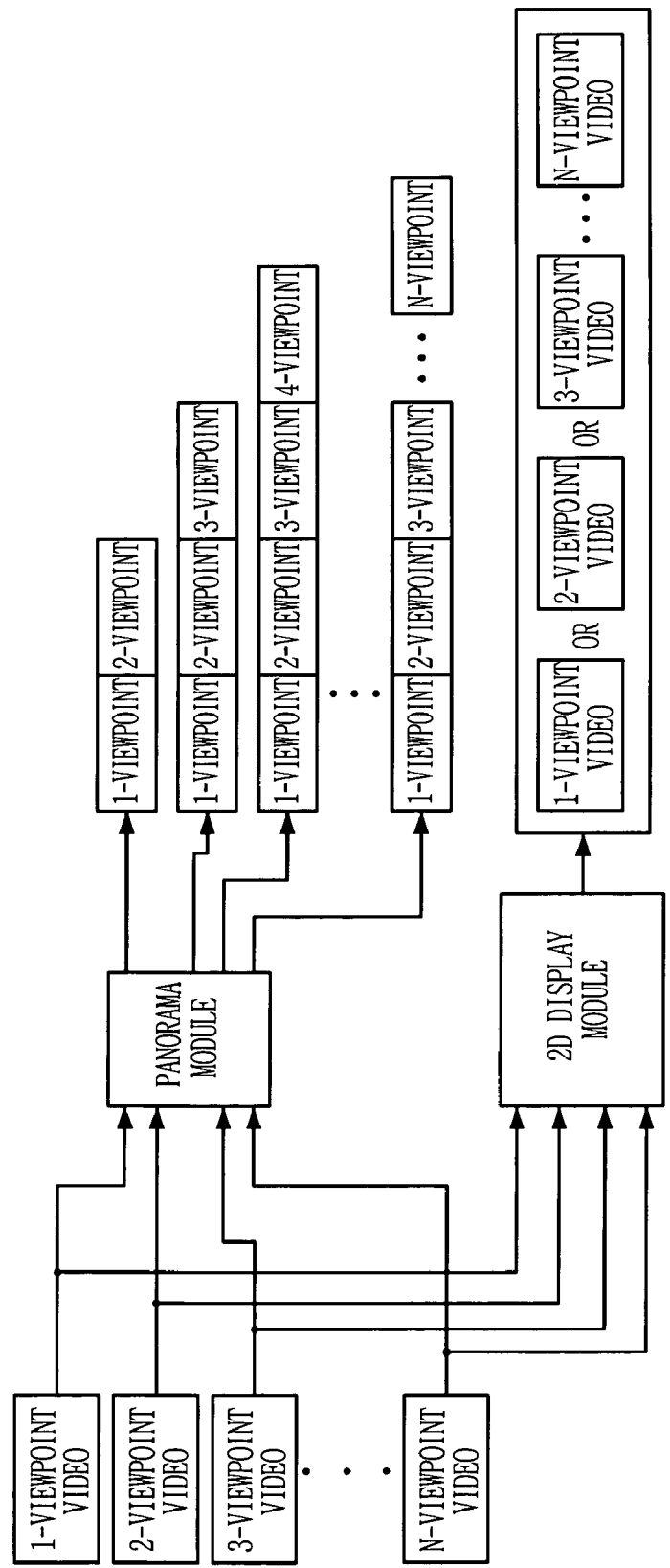
FIG. 4 is a diagram describing a conventional method for displaying multi-viewpoint three-dimensional video in accordance with another embodiment of a prior art.

FIG. 4 is a diagram describing a conventional method for displaying multi-viewpoint three-dimensional video in accordance with another embodiment of a prior art, and it presents a case where space is not kept between stereoscopic cameras.

The multi-viewpoint three-dimensional video includes more than three viewpoints and, basically, it supports the two-dimensional/panorama display methods.

Figure 5:
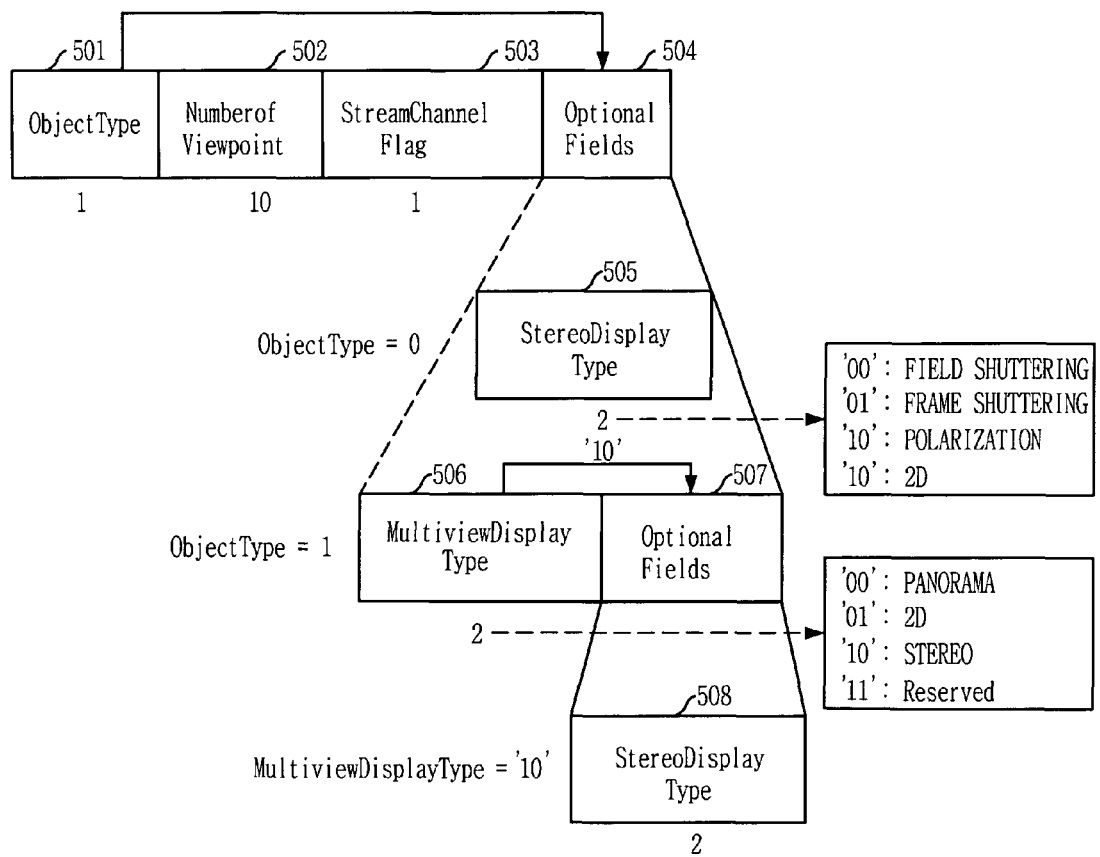
FIG. 5 is a diagram illustrating a three-dimensional video processing apparatus and method using proposed MPEG-4 object descriptor information and structure in accordance with an embodiment of the present invention.

FIG. 5 is a diagram illustrating a three-dimensional video processing apparatus and method using MPEG-4 object descriptor information and structure in accordance with an embodiment of the present invention, and it presents information and structures included in an object descriptor to process and express the three-dimensional video.

The present invention relates to a three-dimensional object descriptor structure for transmitting and representing three-dimensional video based on the MPEG-4, and it processes the three-dimensional video in an MPEG-4-based system by including information newly required in addition to the conventional MPEG-4 object descriptor structure which is defined focusing on two-dimensional video processing.

Herein, the information are added to the object descriptor as a new structural element or added to the extension descriptor of the object descriptor as a new descriptor.

An object type field (ObjectType) 501 occupies one bit and it indicates the kind of three-dimensional video which is acquired according to the number and arrangement of cameras. That is, if it is "0," it means binocular three-dimensional video and, if it is "1," it means multi-viewpoint three-dimensional video.

A viewpoint number field (NumberofViewpoint) 502, which occupies 10 bits, indicates the number of viewpoints of three-dimensional video and it can support up to 1,024 viewpoints.

Therefore, the client can know the kind of the three-dimensional video and the number of viewpoints from the object type field (ObjectType) 501 and the viewpoint number field (NumberofViewpoint) 502 which are included in the transmitted object descriptor.

A stream channel flag (StreamChannelFlag) field 503 occupies one bit and it indicates the number of media streams based on the viewpoint. That is, if it is "0," it means that there is an elementary stream of media based on each viewpoint number and, if it is "1," the elementary stream of media based on each viewpoint number is multiplexed and exist as only one stream.

A stereo display type field (StereoDisplayType) 505 of an option field (Optionalfields) 504 occupies two bits and, if the object type (ObjectType) is zero, it is activated and indicates a display method of binocular three-dimensional video. That is, if it is "00," it denotes the field shuttering display method and, if it is "01," it means the frame shuttering display method. If it is "10," it denotes the polarized light display method and, if it is "11," it denotes the two-dimensional display method.

A multi-viewpoint display type field (MultiviewDisplayType) 506, which occupies two bits, is activated when the object type (ObjectType) 501 is 1 and it indicates a multi-viewpoint three-dimensional video display method. That is, if it is "00," it indicates the panorama display method and, if it is "01," it indicates the two-dimensional display method that transmits and displays only image of one viewpoint. If it is "10," it denotes the stereoscopic display method and, if it is "11," it indicates a reserved state.

As seen in FIG. 3, the stereoscopic display method is activated only with respect to the multi-viewpoint three-dimensional video which is acquired with a stereoscopic camera space or with a space as wide as the binocular distance of a human being.

When the stereoscopic display method is activated, video of all viewpoints is not displayed and only video of two viewpoints is transmitted and displayed as described in FIG. 3. Then, the client analyzes the transmitted object descriptor and requests a server for a viewpoint that can present a stereoscopic display. Also, when the stereoscopic display method is activated, the display method is determined based on the stereo display type field (StereoDisplayType) 505.

In other words, the present invention proposes the object type (ObjectType) information for representing whether video inputted from cameras is binocular (two-viewpoint) three-dimensional video or multi-viewpoint (more than three view points) three-dimensional video, the viewpoint number (NumberofViewpoint) information for indicating the number of cameras or the number of viewpoints of inputted video, the stream channel flag (StreamChannelFlag) information for indicating the number of media streams based on each viewpoint number, the stereo display type (StereoDisplayType) information for indicating the two-dimensional/field shuttering/frame shuttering/polarized light display method with respect to the binocular three-dimensional video, and the present invention defines the object descriptor to include the above information.

Figure 6:
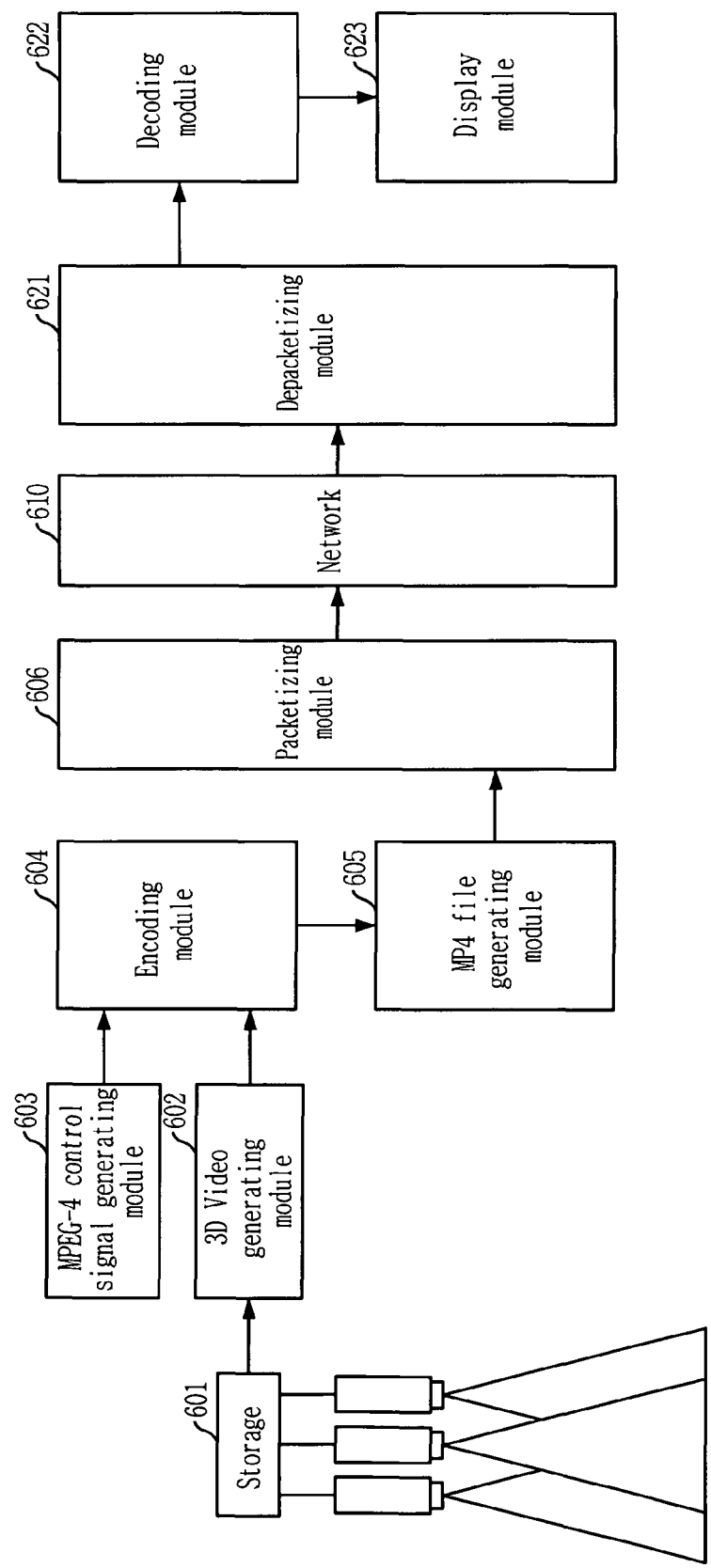
FIG. 6 is a block diagram showing a three-dimensional video processing apparatus using proposed MPEG-4 object descriptor information and structure in accordance with an embodiment of the present invention.

FIG. 6 is a block diagram showing a three-dimensional video processing apparatus using MPEG-4 object descriptor information and structure in accordance with an embodiment of the present invention.

As illustrated in FIG. 6, the three-dimensional video processing apparatus of the present invention includes a storage 601, a three-dimensional video generating module 602, an MPEG-4 control signal generating module 603, an encoding module 604, an MP4 file generating module 605, a packetizing module 606, a network 610, a depacketizing module 621, a decoding module 622, and a display module 623. The storage 601 stores video acquired from cameras. The three-dimensional video generating module 602 converts the size and color of video transmitted from the storage 601. The MPEG-4 control signal generating module 603 generates an MPEG-4 object descriptor and a Binary Format for Scene (BIFS) descriptor. The encoding module 604 encodes a three-dimensional video and an MPEG-4 control signal which are inputted from the three-dimensional video generating module 602 and the MPEG-4 control signal generating module 603, respectively by using an MPEG-4 encoding method or a conventional encoding method, and outputs elementary streams. The MP4 file generating module 605 generates an MP4 file as defined in the MPEG-4 system standards by receiving media data of the elementary stream outputted from the encoding module 604 and an MPEG-4 control signal for media. The packetizing module 606 generates and transmits packets defined in the MPEG-4 system standards by extracting a three-dimensional video media stream, which is stored in an MP4 file generated in the MP4 file generating module 605 and the MPEG-4 control signal. The network 610 transmits packet stream transmitted from the packetizing module 606. The depacketizing module 621 depacketizes the three-dimensional video which is formed of a header and a payload by receiving the packet stream transmitted through the network 610. The decoding module 622 restores the three-dimensional video by decoding the data transmitted in the depacketizing module 621. The display module 623 displays video restored in the decoding module 622.

The three-dimensional video generating module 602 acquires and generates three-dimensional video through the camera and the storage 601 and it converts the size and color of the acquired video.

The MPEG-4 control signal generating module 603 generates the MPEG-4 object descriptor and the BIFS descriptor. The object descriptor includes correlation between video and structural information of a link. Herein, generated is an object descriptor which includes newly required information about the three-dimensional video while maintaining compatibility with the conventional object descriptor.

The encoding module 604 encodes the inputted three-dimensional video and the MPEG-4 control signal using the MPEG-4 and conventional decoding methods and outputs elementary streams.

The MP4 file generating module 605 generates an MP4 file defined in the MPEG-4 system standards by receiving the elementary streams of media data outputted from the encoding module 604 and an MPEG-4 control signal for media.

The packetizing module 606 generates and transmits packets defined in the MPEG-4 system standards by extracting three-dimensional video media stream and MPEG-4 control signal which are stored in the MP4 file.

The depacketizing module 621 depacketizes the three-dimensional video which is formed of a header and a payload by receiving packet streams transmitted through the network 610, and transmits the three-dimensional video data to the decoding module 622.

The decoding module 622 decodes the three-dimensional video according to the system environment of the client and the display method selected by the user.

The display module 623, which displays the decoded video, provides the user with the three-dimensional video and a user interface through rudimentary manipulation by the user.

FIG. 7 is a flowchart describing a three-dimensional video processing method using MPEG-4 object descriptor information and structure in accordance with an embodiment of the present invention.

As illustrated in FIG. 7, at step 701, the three-dimensional video processing method of the present invention which uses the MPEG-4 object descriptor information and structure determines whether there is an access request from a client in a three-dimensional video transmitting server.

If there is no access request, at step 702, the waiting mode is maintained and, if there is an access request, at step 703, the initial object descriptor is transmitted from the server to the client and then, at step S704, a session for the three-dimensional video service is established.

Subsequently, at step 705, the server receives a request for an object descriptor or a BIFS descriptor from the client and, at step 706, it transmits the object descriptor or the BIFS descriptor.

Subsequently, the server establishes a channel for transmitting the three-dimensional video at step 707, receives a request for the three-dimensional video from the client at step 708, and transmits the three-dimensional video at step 709. Then, at step 710, the client restores and displays the three-dimensional video.

As described above, the three-dimensional video processing method of the present invention which uses the MPEG-4 object descriptor information and structure is performed largely in two steps.

The first one is a call-setup step in which the three-dimensional video server waits for an access request upon execution. If there is an access request from the client, the server transmits the initial object descriptor. Otherwise, it goes into a waiting mode. The initial object descriptor provides a profile and level information that are needed for restoration, and the client generates a channel for receiving the object descriptor or BIFS descriptor by describing the profile and level information, which is called session establishment.

The next one is a data transmission step, in which if the server receives a request for the object descriptor or the BIFS descriptor from the client, the server transmits the object descriptor or the BIFS descriptor to the client. Also, the client generates a channel for receiving the actual three-dimensional video data by analyzing the data. Herein, a descriptor including display information of the three-dimensional video is added to the transmitted object descriptor, and the client determines restoration and display method based on it.

As described above, the present invention provides an object descriptor structure for providing a three-dimensional video service based on the MPEG-4. The present invention has an effect of supporting diverse types of services for a user by defining information newly requested for processing and expressing three-dimensional video while maintaining compatibility with an MPEG-4 object descriptor structure, which is formed focusing on two-dimensional video, and suggesting an object descriptor for three-dimensional video including the information.

While the present invention has been described with respect to certain preferred embodiments, it will be apparent to those skilled in the art that various changes and modifications may be made without departing from the scope of the invention as defined in the following claims.

What is claimed is:

1. An apparatus for processing three-dimensional video, comprising:
    a storing means for storing video acquired with a predetermining video acquisition device;
    a three-dimensional video generating means for converting a size and color of video transmitted from the storage;
    an MPEG-4 control signal generating means for generating a Moving Picture Experts Group (MPEG)-4 object descriptor and a Binary Format for Scene (BIFS) descriptor;
    an encoding means for encoding the three-dimensional video control signal and the MPEG-4 control signal inputted from the three-dimensional video generating means and the MPEG-4 control signal generating means, respectively through an MPEG-4 and encoding method, and outputting elementary stream (ES);
    an MP4 file generating means for generating an MP4 file in conformity to an MPEG-4 system standards by receiving media data of the elementary stream outputted from the encoding means and the MPEG-4 control signal;
    a packetizing means for extracting three-dimensional video media stream and the MPEG-4 control signal that are stored in the MP4 file generated in the MP4 file generating means, and generating and transmitting the extracted three-dimensional video media stream and the MPEG-4 control signal based on the MPEG-4 system standards;
    a depacketizing means for receiving the packet stream transmitted from the packetizing means and depacketizing three-dimensional video data including a header and a payload;
    a decoding means for decoding the data transmitted from the depacketizing means and restoring three-dimensional video; and
    a display means for displaying the video decoded in the decoding means, wherein the MPEG-4 object descriptor includes information indicating whether the video inputted through the video acquisition device is binocular or multi-viewpoint three-dimensional video, and information indicating the number of viewpoints of the inputted video.

2. The apparatus as recited in claim 1, wherein the three-dimensional video generating means acquires/generates three-dimensional video with the video acquisition device and the storing means, and converts the size and color of the acquired video.

3. The apparatus as recited in claim 1, wherein the MPEG-4 control signal generating means generates the MPEG-4 object descriptor and the BIFS descriptor, and the MPEG-4 object descriptor including information on correlation between video and link structural information and includes information required for three-dimensional video while maintaining compatibility with a conventional object descriptor.

4. The apparatus as recited in claim 1, wherein the decoding means decodes the three-dimensional video based on a system environment of a client and a display method selected by a user.

5. The apparatus as recited in claim 1, wherein the display means displays the decoded video and provides a user interface through rudimentary manipulation of the user to provide the user with the three-dimensional video.

* * * * *